Nov. 27, 1928.
G. H. PETRI
1,692,860
BREAD MAKING APPARATUS
Filed Oct. 20, 1922   3 Sheets-Sheet 1
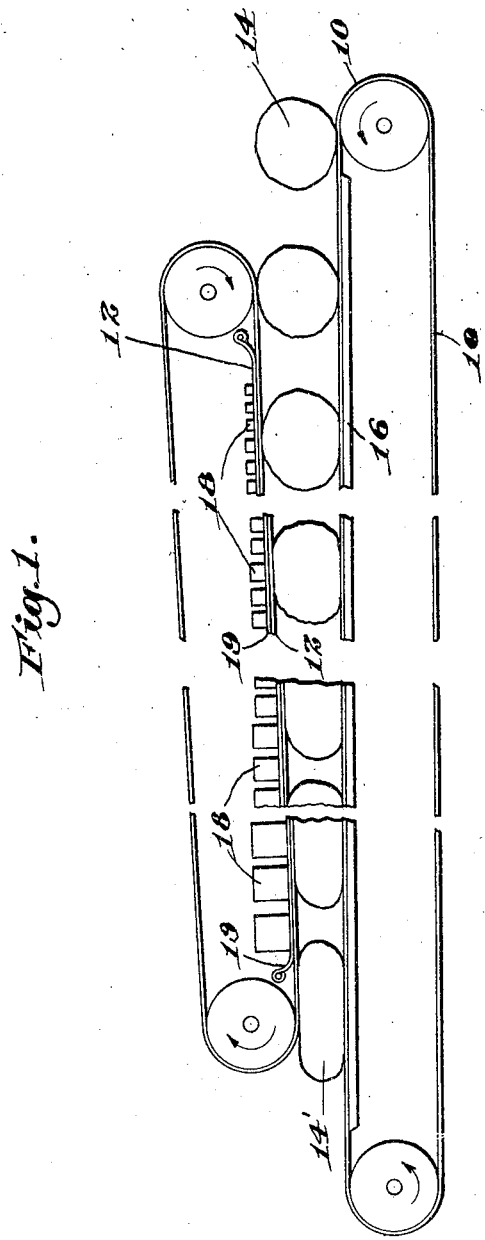
Inventor
Gunther H. Petri
by Mitchell, Chadwick & Kent
Attorneys

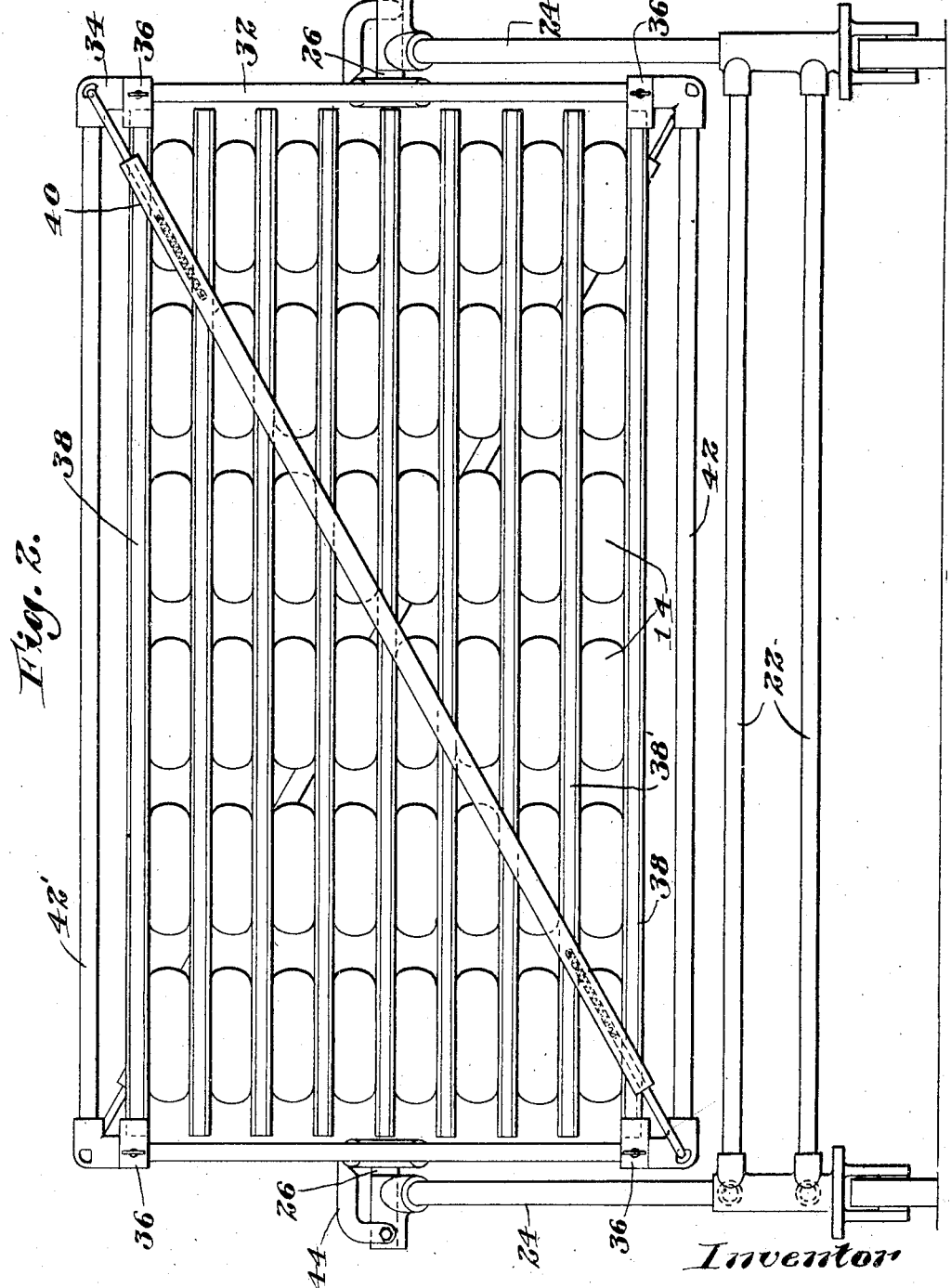

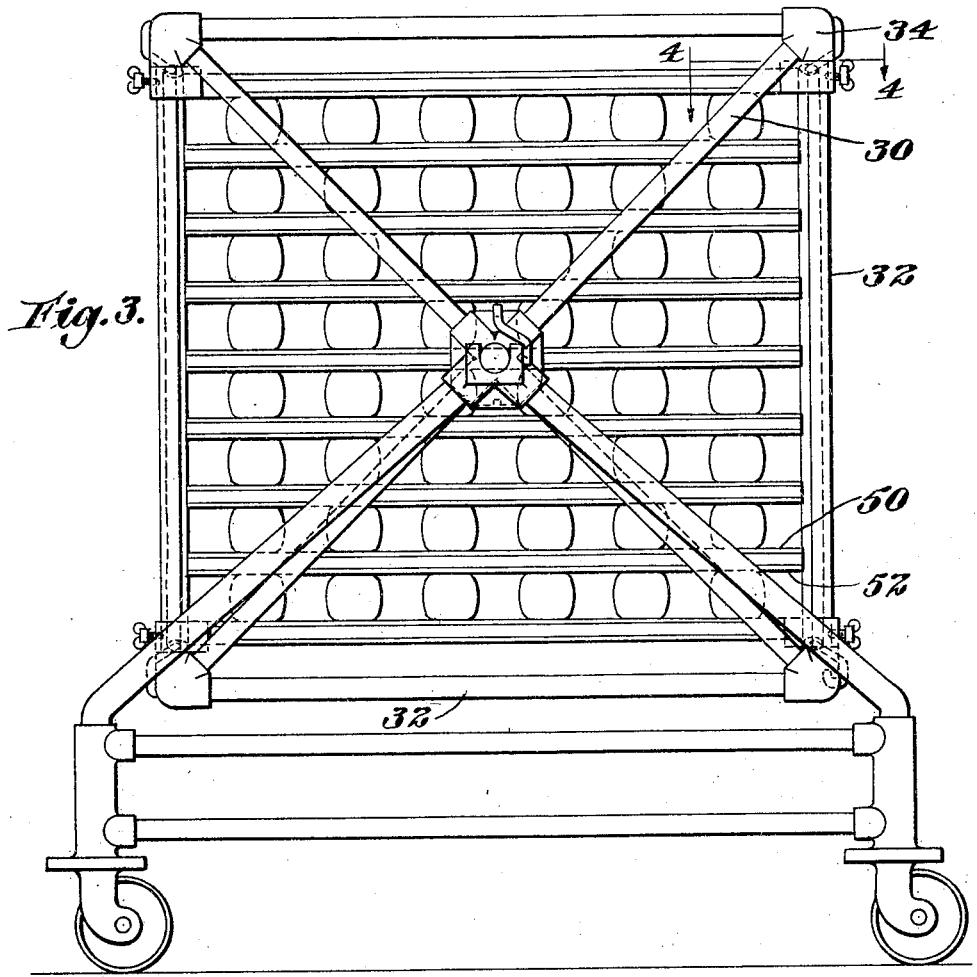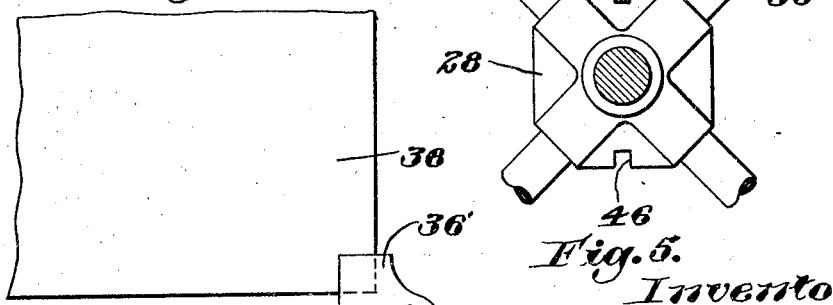

Patented Nov. 27, 1928.

UNITED STATES PATENT OFFICE.

GUNTHER H. PETRI, OF BOSTON, MASSACHUSETTS, ASSIGNOR TO THE PETRI AND JONES COMPANY, INCORPORATED, OF BOSTON, MASSACHUSETTS, A CORPORATION OF MASSACHUSETTS.

BREAD-MAKING APPARATUS.

Application filed October 20, 1922. Serial No. 595,746.

This invention relates to improvements in bread making apparatus. More particularly it relates to the proofing of the dough. It is the practice to divide and form the dough into balls and then to "proof" it for five or ten minutes, that is, to allow it to stand while fermentation proceeds, before molding after which it is further proofed or allowed to rise for fifteen or twenty minutes in baking pans, and then is baked. The present invention provides apparatus for reducing the cost of the proofing operation, and for improving the process and the product thereof.

In my Letters Patent No. 1,355,908, I described some parts of the present invention and claims thereon excluded from the application for that patent are presented herein, together with a description of and claims for apparatus by which the process may be carried out. Briefly, the process comprises the placing of the balls of dough under gentle static pressure during the proofing. It is a result of this that the dough is proofed in such manner as to prevent the fermentation forming large bubbles within it, thus making a fine grained bread product.

It is another result that the lumps of dough are left by the improved process in disk shape, somewhat flattened from their ball aspect, and are thus better prepared for the molding machine to which they go next; and it is another result that the opposite sides of a ball or disk are rendered respectively adhesive and non-adhesive. During the proofing the dough is free to expand horizontally, because the static pressure is applied only in one direction and that preferably is the vertical direction. The difference between the adhesive characteristic of the sides of the dough is produced by having one side of the dough in contact with a face or material, such as tin, which is non-absorbent of moisture and having the face of the material which affords the opposing pressure upon it made of felt or canvas well dusted with flour.

For the execution of this process two forms of apparatus are herein shown, one of which comprises a pair of conveyer belts running horizontally, between which the lumps of dough are gently compressed for the predetermined proofing period. These belts are arranged substantially parallel, one above the other, with the lower one moving over a smooth unyielding supporting surface. The upper one presses on the intervening lumps of dough which are carried on the lower one, with the said gentle pressure, which may be obtained in various ways. In the specific case illustrated this pressure is shown as being obtained from a succession of stationary loose weights which depress the upper belt. The speed of the belts and the longitudinal distance which they run with the dough compressed between them, determine the length of time during which the pressure continues; and it is contemplated that the whole of the desired proofing period of five or ten minutes be occupied by a lump of dough in passing from the entrance to the exit between the two belts. The capacity of such machine will vary according to the width of the belts, it being possible to have the belts move rather slowly and nevertheless be capable of receiving successive lumps fairly rapidly, by having the belt wide so that while a lump deposited thereon is slowly moving far enough to make room for another lump directly behind it the lumps which succeed the first in time of arrival at the machine are placed beside it in an oblique line across the belt as they arrive one by one.

Another apparatus by which the same process may be applied with a vertical pressure, but without the horizontal progression and without the power mechanism, is provided by a frame on which trays may be stacked with layers of lumps of dough intervening, so that the bottom tray, for example, supports a layer of lumps which in turn supports the second tray on which are other lumps which in turn support the third tray and so on to the top of the stack. It will be observed that the bottom layer of lumps is under whatever pressure is afforded by the weight of the stack above it, and that the pressure at the higher levels is less because less of the stack is above them. This apparatus has means for gripping the stack of trays and inverting it, whereupon the layer which was on top with light pressure becomes subject to the heavier pressure of a layer at the bottom of the stack. Moreover, that layer which was at the bottom and which has undergone proofing for the longest time of any in the stack may now, at the top, be readily removed, while the layers below it which have had less proofing time are reached and removed in turn. If the rate of deposition and the rate of removal are substantially equal, and the reversal of position occurs midway between the completing of the stack and the beginning of its demolishing, all lumps in the stack will in the end have had substantially the same amount of proofing time and pressure.

The accompanying drawings show in a diagrammatic way the execution of the process and the construction and operation of apparatus by which it may be performed. It is intended that the patent shall cover by suitable expression in the appended claims, whatever features of patentable novelty exist in the invention disclosed.

In the drawings:

Figure 1 is a diagrammatic representation of apparatus for carrying out the proofing process while the dough is traveling;

Figure 2 is a side elevation of apparatus showing how the process may be performed with the lumps of dough substantially stationary in stack formation;

Figure 3 is an end elevation of the apparatus of Figure 2; and

Figures 4 and 5 are details, on section lines 4—4 and 5—5 respectively of Figure 2.

Referring to the drawings: Figure 1 shows diagrammatically a pair of conveyor belts 10, 12 receiving unproofed balls 14 of dough at their entrance end, and discharging proofed disk-shaped lumps 14' at their exit ends. While the dough travels along with and between the belts the process of the present invention is carried out. Before reaching the conveyors the batch of dough will have been divided into pieces of suitable size, which for loaves of bread may be one pound or one and one-half pounds in weight, or which for rolls may be pieces weighing but a few ounces, and these pieces will have been formed or "rounded up" by hand or machine into balls. These balls 14 are placed on the lower belt 10, which for convenience of loading and unloading may extend somewhat beyond the ends of the upper belt 12, and at once begin their travel. The lower belt slips horizontally over a fixed table or support 16 arranged close to the underside of the belt 10 to prevent it from sagging or yielding downward. The upper belt may be parallel to the other, or preferably may slightly approach it as travel proceeds.

The gentle static pressure found advantageous for proofing is provided by arranging on the upper side of the upper belt suitable means for causing this belt continuously to press the balls vertically against the lower belt. This gradually compresses and flattens the balls into the desired disk shaped lumps, prevents expansion of gas bubbles, and makes a fine grained product. In the diagram, the pressure is supplied by a series of weights 18 which rest upon a flexible strip support 19, which presses upon the upper belt as it slides. These weights 18, gradually increase in size toward the discharge end of the belt and therefore the pressure on the dough is progressively greater as the proofing continues.

Time being an important element in the process of proofing, the conveyor belts are made of such length, and travel at such speed, that the time consumed while a ball of dough moves forward with the belts is that period found to be desirable for the proofing of the material at hand. Variations of time required for proofing is within the control of the machine by simply changing the velocity of the belts. The capacity of the machine is proportional to the width of the belts, which determines the number of adjacent rows which can travel between the belts simultaneously. A convenient proportion of width to speed of belt is that which enables each successive ball to be placed beside and somewhat to the rear of the next preceding one in an oblique line across the belt, so that when the last ball is placed on one edge of the belt, the ball placed in the same oblique row on the first edge will have moved forward far enough to permit the next ball to be placed behind it as the beginning of a new oblique row.

The process also provides for making one side of the finished disk wet and somewhat sticky, and the other side dry and non-adhesive. This is accomplished by keeping the upper belt moist, as by passing it over a wetting roller on its return trip or by providing it with a moisture proof non-absorbent surface; and by keeping the lower belt dry, as by dusting it with flour. After proofing, the pieces go to the molding machine. Thus perepared the dough can adhere to a roll of the molding machine as a carrier as explained in my said patent, and be drawn forward by that one of the machine rolls which is on the sticky side, thinned by pressure and by draft, and then curled and wound into a cylindrical mass. The adherence is provided by making somewhat wet that surface of the dough which is to come into contact with the carrier roll; and this is accomplished automatically, together with the described refinement of the dough texture, and the reshaping of the dough from ball to disk shape, by the simple process already described. As proofing goes on while the disks are moving forward, the dough which contacts against the wet or non-absorbent belt becomes moist; the ball becomes flat because of the pressure of the upper belt upon it; and its grain becomes fine because the continuous static pressure keeps the bubbles small. The dough thus prepared is wet enough on one side to adhere to the carrier roll of the moulding machine, and is dry enough on its other side so that it does not adhere to the adjacent compressing or thinning rolls of that machine.

The described arrangement by which the dough may be proofed while moving forward lends itself to factory conditions where the progress of dough is substantially continuous from its mixing to its entrance into the baking oven. The belt conveyors while subjecting the balls to a gentle pressure also carry them forward from the rounder to the molding machine or to a suitable auxiliary conveyor which may take them directly to the place where the next operation is to be performed.

Figure 2 shows apparatus for handling dough balls in vertical stacks during the carrying out of the proofing process at a fixed location in the shop. In this form of apparatus which may be easily and economically constructed with iron pipe and pipe fittings, there is provided a standard having a revoluble holder adapted to support trays upon which the dough balls may be loaded. The base or floor frame 22 has upright supports 24 providing journals, and the opposite ends of the holder each has a short axle 26 of which projects from the center block 28 of the end assemblies of the holder. Each end assembly of the revoluble holder is a rectangle with diagonal members 30, marginal members 32 and corner connectors or fittings 34. On each of the two opposite and parallel marginal members 32, which ordinarily stand vertical, of each end assembly, are two tray supporters 36 adapted to be clamped at different points along the member 32 upon which they are mounted. These supporters have a somewhat cupped portion 36' forming a shelf into the hollow of which a corner of a dough tray may fit. In loading, the holder frame is swung till four supporters are set at their lowest points; and the corners of the first tray are placed upon them. This tray may be already loaded with dough balls, 14 or the latter may be placed thereon as they are delivered by a forming machine or from hand operatives. When the first tray has its quota of balls distributed over it, a second tray is placed upon them likewise loaded. No support for the second tray is provided other than the lumps of dough on the lower tray, so that the latter will be subjected to the weight of the tray and contents above it. Other trays with dough distributed over them are added until the stack approaches the top of the holder, an empty tray 38'' being on the last layer of balls, and its corner engaged by the other four supporters which are at the upper ends of the marginal frame members 32. These holders are then slid down against the top tray and clamped tight, and the holder and load are then ready for inversion It will be obvious that the lower layers of dough balls are under greater weight, and will have been in position a longer time than the layers last loaded. Therefore, in order to obtain uniformity in total number of pressure-time units, so that the proofing and effect on all lumps will be substantially the same, the holder after being loaded is revolved about its axle 26 a half turn. This brings the bottom layer to the top and the top layer to the bottom. By removing the now upper tray supporters, the top tray can be removed, and the layer of dough balls which was first placed is in position to be removed first. If the time of unloading be substantially the same as that taken for loading, and if the inversion of the trays occurs about midway between the completion of the loading, and the beginning of the unloading, the product of the pressure exerted and the time it is imposed will be approximately the same for all the dough balls.

Ordinarily the friction between the dough balls and the tray surfaces will prevent any slippage during the half rotation of the carrier, but as an additional precaution against displacement, cross rods or bars 40 may be hooked to opposite corner connectors 34 on the side of the tray holder which turns under as it revolves. A cross bar similarly placed on the side of the holder opposite to that on which the trays are inserted aids in aligning the latter when they are placed, as well as in steadying them during inversion.

The end assemblies of the holder are rigidly connected by longitudinal members 42, 42' which are preferably placed so as to be on diagonally opposite edges of the stack, with the one (42) which is on the loading side at the bottom. When revolved for unloading this connection bar 42 will be on the upper edge at the back and the other (42') at the bottom, so that neither interferes with the placing and removal of the trays. A latch 44 arranged on the fixed supports 24 of the base engages notches 46 in the center block 28 of the holder, whereby the latter may be locked against turning or tipping.

The trays 38 may be made of wood with a lining 50 of felt or canvas on one side and a lining 52 of tin on the other side. This makeup of the trays is shown exaggerated in size on the drawings for clearness. The trays are stacked preferably with their felt sides upward and the latter may be dusted with flour, while the tin sides are left bare. This results in the formation of a dry side and a wet side on each flattened ball, that surface next to the felt being dry and non-adhesive, and that next to the tin being wet and somewhat sticky. The provision of such surfaces enables the dough after proofing to be immediately introduced to a molding machine as heretofore described.

The proofing goes on while the stack is being made, the dough which contacts against the tin, above it, becomes moist; the lump becomes flat because of the weight piled upon it; and its grain becomes fine because the continuous static pressure keeps the bubbles small. The weight and lapse of time while the stack is being piled is sufficient to complete the process as regards the bottom layer. The stack being then turned over, and the disks gradually removed for passage through the molding machine those which were at the bottom are relieved of weight, and reach the end of their time allotted for proofing; while their weight, until such removal, is applied to those that were above and that at first had least pressure. The dough thus prepared is wet enough on one side to adhere to the carrier roll of the molding machine, and is dry enough on its other side so that it does not adhere to the adjacent compressing or thinning rolls of that machine.

It will be observed that in both forms of apparatus the lumps of dough are subject to moderate static flattening pressure during the proofing. In the last case they are substantially stationary; in the other case they are constantly in motion, but the surfaces which are in contact with them above and below move at the same rate of speed so that relative to the dough the pressure is static. Moreover in both cases the pressure is or may be variable during the proofing, but the total product of time multiplied by pressure for each lump is substantially the same for all so that all are similar in result.

I claim:

1. Apparatus for use in connection with dough during its proofing, comprising supports set loosely at such distances apart as to engage opposite sides of lumps of dough arranged between them; mounting means on which said supports are movable; weights pressing the supports gently together; and other weights in position to add pressure thereon and on the intervening dough, without material shifting of the positions, relative to each other, of the supports and the said dough between them.

2. Apparatus for use in connection with dough during its proofing comprising a stack of plane dough supports, each pair of adjacent supports in the stack being adapted to embrace a layer of lumps of dough; and mounting means whereon said stack is invertible without material shifting of the positions, relative to each other, of the supports.

3. Apparatus for use in connection with dough during the proofing comprising a stack of plane dough supports; a revolvable holder for said stack of dough supports and a frame upon which the holder is pivotally mounted; there being a cross bar attachable to said holder for maintaining said supports from slippage when said holder is rotated to invert the said stack.

Signed at Detroit, county of Wayne and State of Michigan this 18th day of October, 1922.

GUNTHER H. PETRI.